Figure 8:
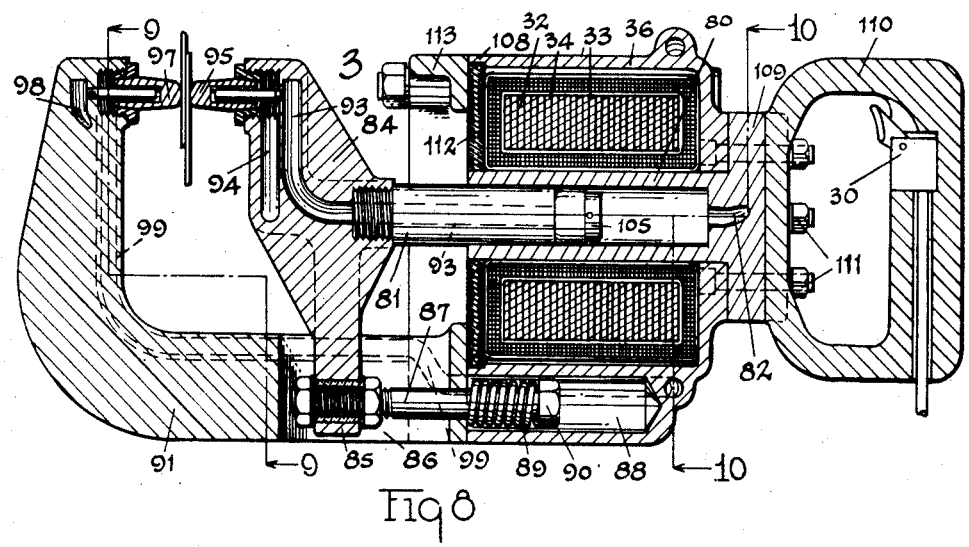

Dec. 8, 1936. W. H. MARTIN 2,063,258
WELDING APPARATUS
Filed Dec. 26, 1935 5 Sheets-Sheet 1
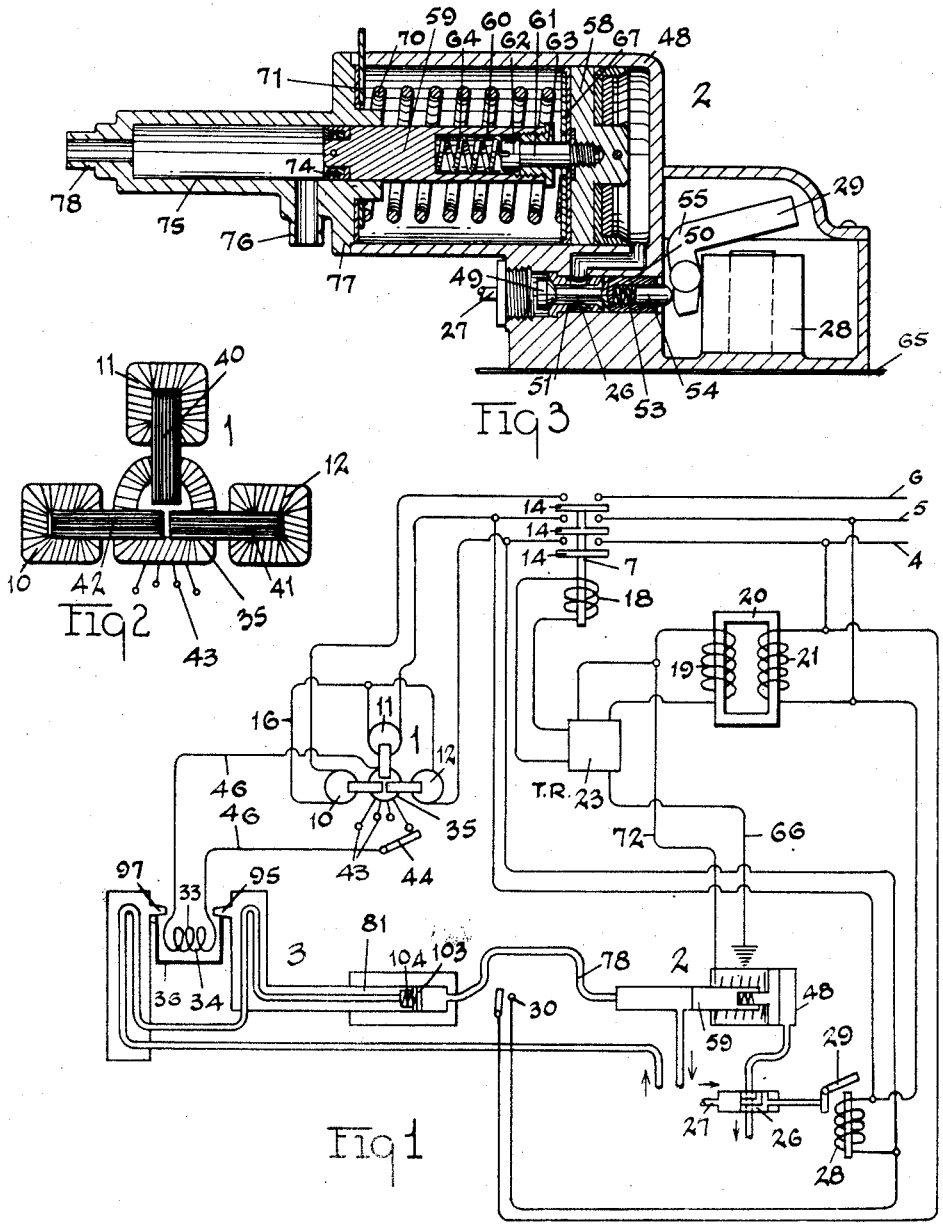
Inventor
William H. Martin
By Faust F. Crampton
Attorney

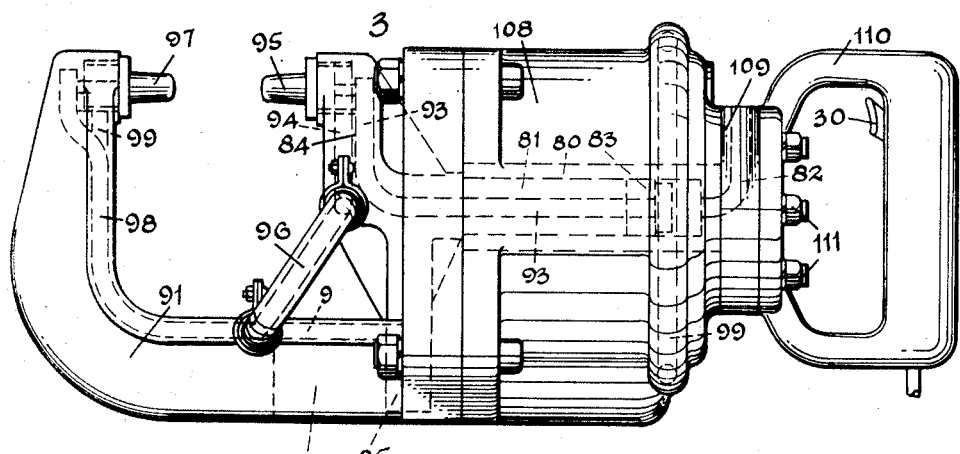
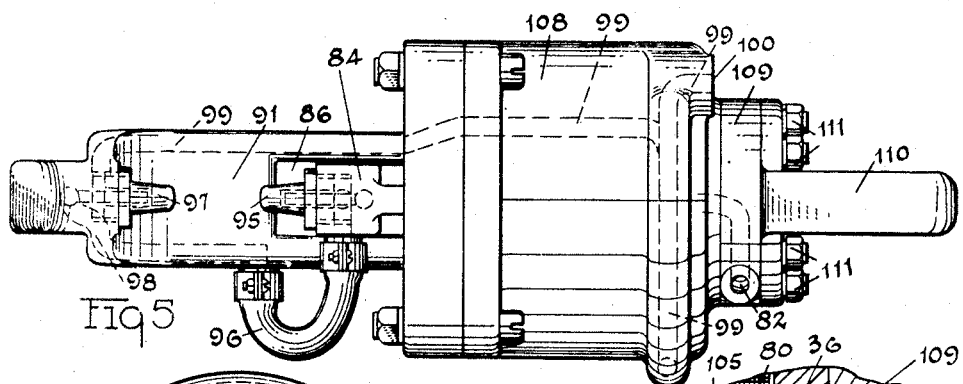
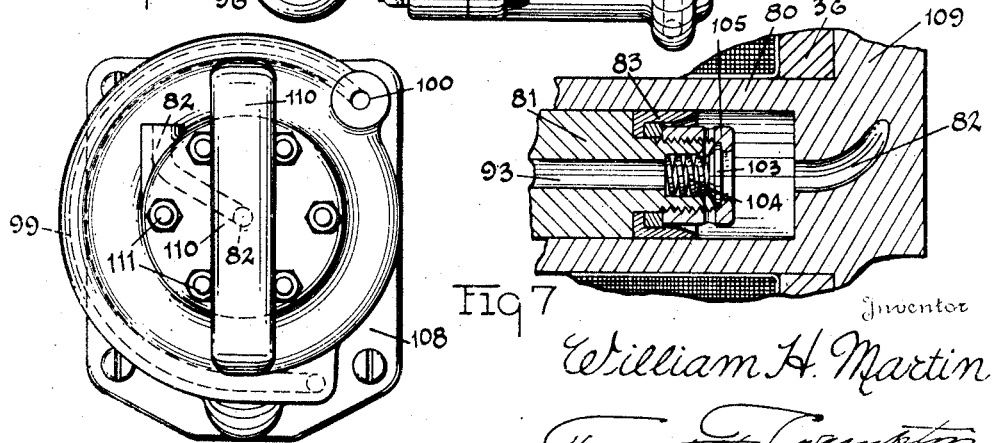

Dec. 8, 1936.    W. H. MARTIN    2,063,258
WELDING APPARATUS
Filed Dec. 26, 1935    5 Sheets-Sheet 4
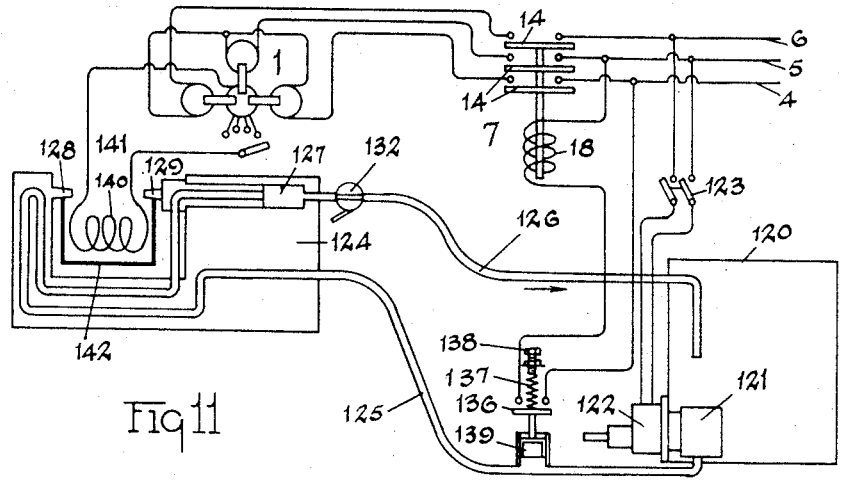
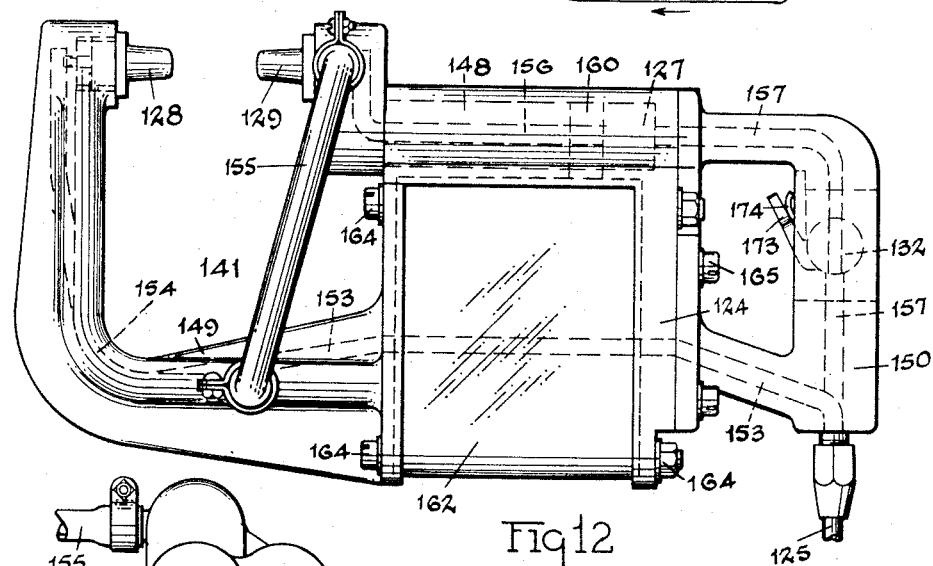
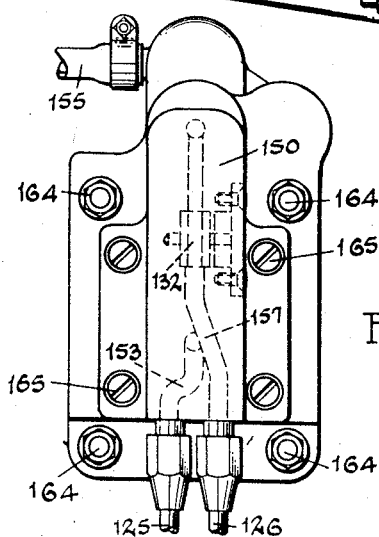
Inventor
William H. Martin
By [signature]
Attorney

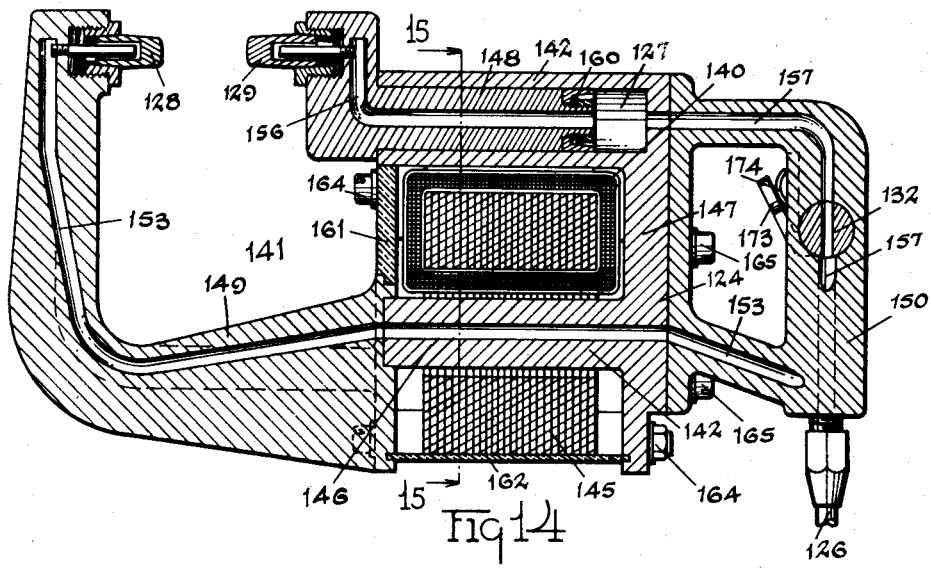
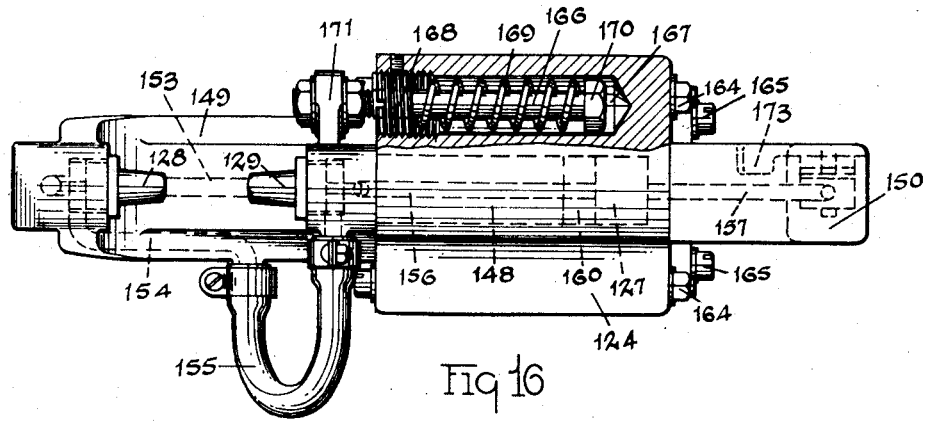
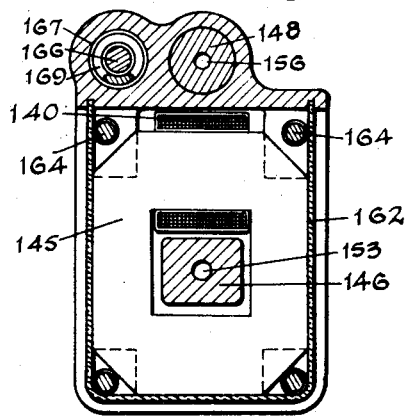

Patented Dec. 8, 1936

2,063,258

UNITED STATES PATENT OFFICE 2,063,258

WELDING APPARATUS

William H. Martin, Detroit, Mich.

Application December 26, 1935, Serial No. 56,142

16 Claims. (Cl. 219—4)

My invention has for its object to produce a welding apparatus wherein conducting cables for air, water, and electricity commonly used for operating welders may be, in part, eliminated and whereby such cables as are used may be greatly reduced in size. The invention is particularly advantageous in its application to hand welders and provides means for eliminating air conductors to the welder. My invention provides for the operation of the welder by the liquid used for maintaining the welding points cool and moreover provides the flexibility of control afforded in the use of pneumatically operated parts.

The apparatus comprises a current-transforming and frequency-changing means that produces a balanced load on the main supply line and transforms a triple phase current of relatively low frequency into a high frequency, single phase current that enables the use of a light weight transformer for transforming a relatively high-potential, high-frequency current into a welding current of low potential and large amperage in a secondary located in close current-conducting relation to the welding points. Consequently, large current-conductive cables, large heat loss, and large potential drop at the welding point are eliminated. The apparatus also comprises a pneumatic-hydraulic pressure booster for hydraulic transmission of pressure to the welder and thus enables the use of a small flexible pipe to transmit an operating pressure to the welder; it enables the use of a very small, light-weight cylinder and piston in the welder for operating the welding point or points and thus further reduces the weight of the welder; and it also enables the use of a secondary that comprises the pressure means that produces the welding pressure, which still further greatly reduces the total weight of the welder.

The apparatus is such as to cause the fluid—preferably a liquid—to flow freely in heat conductive relation with respect to the welding point or points and also with respect to the transformer, which may be mounted on the welder, the welding pressure being produced by stopping the free flow of the liquid, which raises its pressure. Since the power-transmitting liquid may also be utilized for cooling the welding points, its use eliminates the air conductive pipes commonly used for conducting the air under pressure to the welder to actuate the welder. By reason of the reduced number of conductors that are used for connecting the welder with fixedly mounted parts, the greatly decreased weight and increased flexibility of the conductors and the decreased weight of the welder, the welder may be rapidly manipulated manually.

The invention also provides a transforming and frequency-changing means wherein a single secondary is used, which simplifies the structure and enables its production at a greatly reduced cost. Also, if desired, the secondary may be provided with a plurality of connecting points to vary the number of turns of the secondary that are utilized and thus vary the potential of the secondary current.

The invention also provides a remotely controlled hydraulic means for producing the welding pressure at the welding point. Preferably the liquid pressure means is pneumatically operated, and the circuit that produces the welding current is controlled in accordance to the pneumatic pressure that is transmitted through the liquid to the piston of the welder to insure the production of a welding pressure during the existence or flow of the welding current. Preferably the pneumatic controlling valve is electromagnetically actuated and is controlled by a switch located on the welder.

The invention consists in other features which will appear from the following description and upon examination of the drawings. Structures containing the invention may partake of different forms and may be varied in their details and still embody the invention. To illustrate a practical application of the invention I have selected two welding apparatuses as examples of the various structures that contain the invention and shall describe the selected structures hereinafter, it being understood that certain features of the invention may be used to advantage without a corresponding use of the other features of the invention and without departing from the spirit of the invention as presented in the claims. The particular structures selected are shown in the accompanying drawings.

Figure 9:
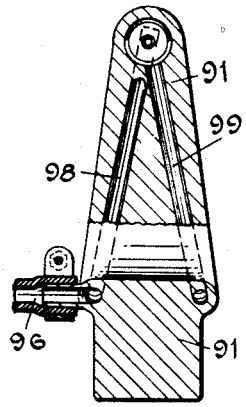
Figure 10:
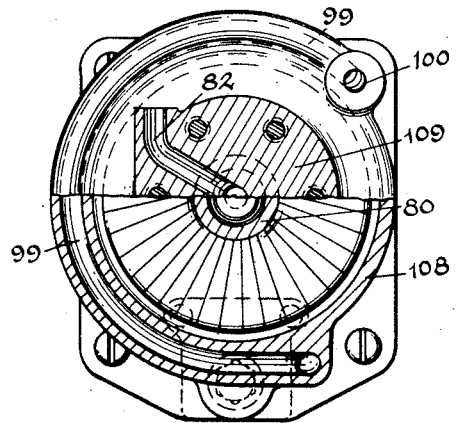

Fig. 1 illustrates diagrammatically the electric, pneumatic, and hydraulic connections of one embodiment of the invention. Figs. 2 to 10, inclusive, illustrate parts of the apparatus conventionally indicated in Fig. 1. Fig. 2 illustrates a top view of a current-transforming and frequency-changing means. Fig. 3 illustrates a pneumatic-hydraulic booster. Fig. 4 illustrates a side view of the welder. Fig. 5 illustrates a top view of the welder. Fig. 6 illustrates an end view of the welder. Fig. 7 illustrates an enlarged section of part of the welder. Fig. 8 illustrates a longitudinal section of the welder. Fig. 9 illustrate a view of the section taken on the plane of the line 9—9 indicated in Fig. 8. Fig. 10 illustrates a view of the section taken on the plane of the line 10—10 indicated in Fig. 8. Fig. 11 illustrates a modification of the apparatus illustrated in Fig. 1. Figs. 12 to 16, inclusive, illustrate a modified form of welder used in connection with the apparatus illustrated in Fig. 11. Fig. 12 illustrates a side view of the welder. Fig. 13 illustrates an end view of the welder. Fig. 14 illustrates a longitudinal section of the welder. Fig. 15 illustrates a view of a section taken on the plane of the line 15—15 indicated in Fig. 14. Fig. 16 is a top view partly in section of the welder illustrated in Fig. 12.

The welding apparatus comprises the current-transforming and frequency-changing means 1, the pressure booster 2, and the welder 3. The apparatus may be connected to a source of supply of triple-phase, alternating current through the main lines 4, 5, and 6. The connection with the main lines may be electro-magnetically controlled by a suitable relay switch 7 that controls the supply of current to the primaries 10, 11, and 12 of the current-transforming and frequency-changing means 1.

The switch is provided with three movable contacts 14 that connect each of the lines 4, 5, and 6 with terminals of the primaries 10, 11, and 12, the remaining terminals of the primaries being connected together by the line 16. The switch 7 is operated by the solenoid or relay magnet 18 that receives its current from the secondary 19 of the transformer 20, the transformer 20 being connected to a pair of the main lines, such as the lines 4 and 5. The flow of the current through the electro-magnet 18 may be directly controlled by the pneumatic-hydraulic booster 2 and is preferably completed when the pneumatic pressure, which is hydraulically transmitted to the welder, reaches a predetermined point. Thus completion of the current from the main lines to the current-transforming and frequency-changing means 1 is prevented until the pressure of the welding point, or points, of the welder, dependent upon the form of the construction, has reached a welding pressure.

If desired, continuance of the flow of the current through the magnet 18 of the relay switch 7 may be controlled by a timing relay 23 of the form well-known in the art whereby the flow of the welding current, once initiated, will continue for a limited and sufficient period to produce an efficient weld, the pneumatic pressure means operating sequentially to discontinue the hydraulic welding pressure immediately thereafter. The timing relay 23 is connected to the secondary 19 of the transformer 20 and also to the electro-magnet 18 and is controlled in its operation by the pneumatic pressure of the pneumatic-hydraulic booster.

The pneumatic pressure in the booster 2 is controlled by a suitable valve 26 that is normally positioned to exhaust the air from the booster. When operated, the valve connects the booster with a source of supply of air under pressure through the pipe 27. The valve 26 is actuated by means of an electro-magnet 28 that operates on an armature 29. The magnet 28 is connected to the main lines 4 and 5 through the switch 30 located on the welder 3. Preferably the switch 30 is normally resiliently maintained open and is closed to initiate the operation of the apparatus. The magnet 28 is also connected to the lines 4 and 5 through the switch 7, to maintain the magnet 28 energized notwithstanding the release of the switch 30. Thus the magnet 28 is maintained energized until the timing relay 23 releases the switch 7 to open the main line, during which time the welding current induced by the transformer 33 flows through the welding points of the welder.

The transformer 33 is mounted on the welder and may be of any of the well-known types. The primary 34 of the transformer 33 is connected to the secondary 35 of the current-transforming and frequency-changing means 1. The secondary 36 of the transformer 33 is formed of actuating parts of the welder and preferably constitutes a single turn to produce a large welding current. The transformer shown in Fig. 8 is a ring type. It induces the flow of the current in the parts that constitute the protective shell and the centrally disposed actuating elements of the welder. The welding current is initiated by the operation of the pneumatic-hydraulic booster and is terminated by the opening of the switch 7 as controlled by the timing relay 23 that opens the circuit of the primary coils of the current-transforming means 1.

Connection of the primary coils 10, 11, and 12 of the current-transforming and frequency-changing means 1 to the three lines of the three-phase circuit produces a balanced load on the main line circuit. The primary coils have, with respect to the cross-sectional area of the cores 40, 41, and 42, a sufficient number of turns to produce super-saturation of the cores, and consequently, the secondary coil 35, which encloses the magnetic circuit of each of the cores, transforms the triple phase of the current of the main lines into a single phase current having a frequency triple that of the main lines.

The secondary 35 is connected to suitable contacts 43 preferably arranged in an arc that is centered at the pivot point of a movable contact 44 whereby the desired number of turns of the secondary may be included in the circuit of the primary 34 of the transformer 33 located on the welder to vary the voltage produced by the secondary 35 of the current-transforming and frequency-changing means 1. The current-transforming and frequency-changing means 1 may, together with the electric elements that control it, such as the transformer 20, the timing relay 23, and the switch 7, be mounted in a suitable fixed position and may be electrically connected by means of the lines 46 to the primary 34 of the transformer mounted on the welder 3. The potential of the secondary 35 is relatively high, and consequently the lines 46 may be correspondingly small and flexible to enable ready manipulation of the welder.

As is well known, welders are commonly operated by air pressure and are commonly connected by means of air pipes with a source of supply of air under pressure to produce a welding pressure of the welding points on the work. Also the welding points are commonly water-cooled by water that freely flows through pipes that lead to and from the welding points. In order to establish the required air pressure to operate the welder considerable time is required to build the air pressure up to the welding pressure because of the compressibility of air and the necessary flexibility and consequent expansibility of the air conducting pipes, which delays the period in which the welding pressure is produced and reduces the number of welds that may be made in a given time. When a liquid is used for transmitting pressure, small pipes that are more flexible per unit of expansibility may be used. The liquid, particularly water, has no compressibility, and consequently there is practically no delay in pressure transmission. The period of the flow of the welding current through the welding points constitutes an exceedingly short period relative to the time in which there is no flow of the current, and if the liquid flows in heat conductive relation to the welding points during the period when there is no flow of welding current, it is ample to maintain the welding points cool even though the welder is operated at a maximum rate.

The invention provides means for utilizing the cooling liquid also for the transmission of pressure from a fixed point to the welder, which is moved from point to point along the work in its use. Thus the invention eliminates the use of air conductors for producing the welding pressure. The invention also provides means for utilizing the flexibility of control inherent in pneumatically operated devices by producing pneumatically a liquid pressure in the cooling stream to operate the welder and cool the welding points. The pneumatically operated, liquid pressure booster may be remotely controlled by means located on the welder. Thus, the pneumatically operated part of the booster may be constructed to cause initiation of the flow of the welding current when the liquid pressure rises to a certain point. This prevents any flow of the current if there is any defect in the operation of the liquid-transmitting means and insures the production of a welding pressure in advance of and during the flow of the welding current and termination of the pressure subsequent to or upon the cessation of the flow of the current.

The booster 2 is preferably fixedly mounted and is provided with a cylinder 48 that is connected to a source of air under pressure through a pipe 27. The movement of the air under pressure to the cylinder 48 is controlled by the valve 26. The valve 26 is provided with a pair of heads 49 and 50 which are adapted to seat upon the ends of a sleeve 51 to permit the air to flow through the pipe 27 to the cylinder 48 or to permit the air to flow from the cylinder. The head 50 is provided with a socket in which a spring 53 and a rod 54 are located. The spring 53 operates to cushion the pressure of the rod 54 produced by the operation of the lever 55, a part of which forms the armature 29 of the magnet 28. When the magnet 28 is energized, the armature 29 is pulled down quickly, which presses the rod 54 axially with respect to the heads 49 and 50. The spring 53 yieldingly transmits the pressure of the rod 54 to move the heads 49 and 50. The head 49 is moved from its seat against the pressure created by the source of supply of air under pressure to admit air into the cylinder 48 as the head 50 closes the outlet of the sleeve 51. The head 50 is channeled in its outer surface, and consequently when the magnet 28 is de-energized and the valve is released, the pressure of the air on the head 49 moves the valve to close the head 49 against its seat and to remove the head 50 from its seat and permit the pressure within the cylinder 48 to return to atmospheric, the excess air being allowed to flow through the channels formed in the head 50 to the exterior atmosphere.

The piston 58 located in the cylinder 48 is formed to have two telescoping parts. Preferably the piston rod 59 is provided with a socket 60 in which is located the head 62 of a bolt 61 secured at one end to the piston 58. The bolt 61 is slidably supported in a bushing 63, and a spring 64 is located intermediate the head 62 and the bottom of the socket. A contact 67 is insulatingly supported on the piston 58, and the bushing 63 forms a coacting contact for grounding the circuit from the contact 67 through the instrument. The booster 2 may be insulatingly supported by suitable insulating material 65 and may be connected at any point by means of a line 66 to the timing relay 23. The contact 67 is connected in the circuit by means of a spring 70 which presses against the contact 67 and an insulatingly supported contact 71 that is connected to a source of supply of electric current, such as to the secondary 19 of the transformer 20 by means of the line 72. The spring 70 yieldingly resists the movement of the piston 58 and operates normally to maintain the parts of the piston rod 59 in their more extended positions and at the same time to conduct the current from the contact 71 to the contact 67; while the spring 64 is a relatively high pressure spring and operates to prevent movement of parts of the piston rod 59 relative to each other until the pressure produced at the end of the piston rod has built up to a pressure such that the pressure of the spring 64 will be overcome to enable telescopic movements of the parts of the piston rods and cause the contact 67 to make contact with the bushing 63 to ground the circuit to the booster and thus complete the circuit through the timing relay 23, which in turn closes the circuit of the main lines 4, 5, and 6 through the switch 7 and produces the flow of the welding current in the transformer 33.

The liquid is normally allowed to flow freely through the cylinders and in heat conductive relation to parts of the welder until a welding pressure is to be transmitted to the welder. The flow of the liquid may be in either direction. When the welding pressure is exerted, its free flow is restricted in order that the pressure may be quickly transmitted. The piston rod 59 is connected to a second piston 74 located in the cylinder 75, and preferably the liquid normally flows first through the passageways in the welder and the cylinder that operates the welder and then to the cylinder 75 of the booster 2. The cylinder 75 has an outlet for the liquid through the pipe 76 that may be connected to a drain or lead to a suitable reservoir. The cylinder 75 is formed integral with the head 77 of the cylinder 48, and the outlet port through which the liquid leaves the cylinder 75 is located contiguous to the head 77. The liquid enters through a small, flexible pipe 78 that communicates with the cylinder 75 through a port located at the end of the cylinder that is remote from the head 77. The pipe 78 is connected to the cylinder 80 located on the welder 3. The cylinder 80 is provided with a piston 81 that actuates the welding point. The cooling liquid flows from the welding points to the cylinder 80 and through a passageway 82 formed in the welder that communicates with the cylinder 75.

The welding point of the welder is operated by the pressure produced by the piston 74 in the cylinder 75 and transmitted to the liquid in the cylinder 80. If desired, the cylinder 80 may have a diameter larger than that of the cylinder 75 to correspondingly increase the pressure produced in the cylinder 80 and correspondingly decrease the length of the stroke of the piston 81, but preferably the cylinder 80 and the cylinder 75 have the same diameter, multiplication of pressures being produced by the difference in diameters of the pistons 58 and 74. By reason of the high pressure produced by the booster 2, the cylinder 80 is relatively small in diameter, its dimensions, however, being such as to obtain the required current-conductive area conducive to minimum size and weight and to translate the required pressure.

The welding point is supported on and actuated by the movement of the piston 81. The piston 81 preferably substantially fits, throughout its length, the interior of the cylinder 80 and is provided with a suitable gasket or cup washer 83. The piston is connected with a block or frame 84 which has an extension 85 located in the slot 86 formed in the body of the welder. The frame 84 extends across the cylinder and carries a welding point at one end in position to engage the work. When the welding point engages the work, the pressure on the work reacts to press opposite ends of the piston against the cylinder wall by the torque produced by the frame 84 and thus insures a good electric contact pressure during the welding pressure to enable free flow of the welding current.

For purposes of insulation the sides of the extension 85 are spaced from the sides of the slot 86. The frame is guided in its movement by a rod 87 that is insulatingly connected to the extension 85. The rod 87 extends into a socket 88 formed in the body of the welder and is resiliently returned from its extreme outward movement by means of the spring 89, which surrounds the rod 87 and is located between a suitable plate or plug located at one end of the socket and the head 90 of the rod. Where two welding points are used to clamp the work, the spring may be located intermediate a welding point-supporting bracket 91 and the head 90.

The piston 81 has a passageway 93 that extends axially through the length of the piston and the frame 84 to which the piston is connected and to the well formed within the welding point 95, which is carried by the frame 84. The frame 84 also has a passageway 94 that connects the welding point 95 to a flexible connector 96, which enables the movement of the liquid through the welding point 95 and movement of the welding point 95 relative to the welding point 97 supported on the bracket 91. The connector 96 connects with the passageway 98 that communicates with the well formed within the welding point 97, and the passageway 99 connects the well of the welding point with the port 100 located in the handle of the welder where the welder is connected to a suitable source of liquid supply. The liquid normally freely flows through the wells of the welding points 97 and 95 and through the piston 81 and the cylinder 80 of the welder and through the cylinder 75 of the booster.

When the piston 74 is moved along the cylinder 75, it first operates to close the outlet port of the cylinder and cause cessation of the flow of the cooling liquid. The pressure that normally causes the flow of the liquid is immediately raised. Also as the piston 74 moves outward with the usual quick movement produced by the air pressure on the piston 58, the pressure in the cylinder 80 is also raised by the resistance to the flow of the liquid in the extended restricted passageways located in the welder. To immediately and further raise the pressure in the cylinder 80 to produce the welding pressure, the welder is preferably provided with an additional pressure means for preventing the outward flow of the liquid from the cylinder 80. The escape of the liquid through the piston 81 may be stopped by means of a pressure-operated valve 103 that operates to close upon an abnormal rise in pressure in the cylinder 80. If the normal flow is from the welder to the booster, the valve is quickly closed by the reverse flow of the liquid in the cylinder caused by the pressure transmitted from the booster to the welder. The valve 103 is normally held open by a light spring 104 but is overcome and the passageway 93 closed by the valve upon a slight rise of pressure of the liquid in the cylinder. The valve 103 is positioned intermediate the end of the cage 105 located on the end of the piston, and the spring 104 is located in a large bored part formed in the piston 81 in alignment with the passageway 93. The valve maintains the passageway closed until the pressure in the cylinder 80 is reduced to the pressure that produces the normal flow of the liquid, which occurs upon the complete return of the piston 74 in the cylinder 75. The return of the piston 74 opens the outlet and permits the normal flow of the liquid from the source of supply through the welder to the booster.

The movement of the piston 74 thus forces the piston 81 outwardly and forces the welding point 95 against the work, the work being located between the welding points 95 and 97. When the pressure rises to a welding pressure, the outer end of the piston rods are held, the resistance of the spring 64 is overcome, and the circuit of the timing relay 23 is completed at the contact 67.

The timing relay 23 maintains the pressure as well as the current flow, since it maintains the circuits closed. The relay 23 automatically opens the circuit of the magnet 18, which opens the circuit of the magnet 28. De-energization of the magnet 28 releases the valve 26 and permits the return of the piston 58 by the operation of the spring 70 and also permits the return of the piston 81 by the operation of the spring 89. This operates to again permit free flow of the liquid through the cylinders 75 and 80 and the passageways of the welder to cool the welding points.

The primary 34 of the transformer 33 is located in a shell 108 and surrounds the cylinder 80. The cylinder 80 is provided with a flanged part 109, and the shell 108, the flange 109, and the handle 110 are secured together by suitable bolts 111. The shell 108, the cylinder 80, and its piston 81 are preferably formed of copper and constitute the secondary of the transformer. The primary is wound on the laminated ring or core 32. Since the frame 84 that carries the welding point 95 is connected to the piston 81, and the bracket 91 that supports the welding point 97 is connected to the shell 108, the welding points 95 and 97 form the terminals of the secondary, and by reason of the large cross-sectional areas of their supporting parts, there is practically no potential drop in the secondary of the transformer. Preferably the welding points are located at one side of the center line trough the transformer 33 to produce a lateral pressure of the piston 81 against the cylinder 80 by the pressure of the welding point 95 against the work and thus produce a contact pressure according to the welding pressure. A suitable insulating plate 112 of fibrous material may be located at the outer end of the shell and cylinder of the welder and clamped in position by an annular part 113 of the bracket 91.

The apparatus shown in Fig. 11 is of a form that may, if desired, be readily mounted on a transportable structure or vehicle and moved to any building or region or any part of a factory and readily connected to a source of supply of electric current at any convenient point in an electric system. It may be provided with a tank 120 containing a liquid, such as water. A positive high pressure pump 121 may be located in the reservoir or tank 120 and electrically driven by an electric motor 122. The motor may be connected with the main electric lines, such as the lines 5 and 6, by means of the switch 123 and its connecting lines. The welder 124 may be similar to that shown in Figs. 1 to 10 or of any other suitable form, such as that shown in Figs. 12 to 16 and indicated diagrammatically in Fig. 11 and operated by the pressure produced by the pump 121.

The welder may be connected to the reservoir 120 and the pump 121 by means of the flexible pipes 125 and 126.

The liquid is directed to the cylinder 127 of the welder through the pipe 125. Preferably the passageways in the welder conduct the liquid in heat conductive relation to the welding points 128 and 129 to remove the heat from the welding points in the interim between the welding operations. A valve 132 is located on the welder for manual operation to restrict the passageway leading through the return pipe 126 to the reservoir or tank 120 and thereby raise the pressure in the cylinder 127 for producing a welding pressure on the work.

A suitable pressure switch may be located in the circuit of the liquid so as to be operated according to the pressure produced at its point of connection to close an electric circuit for causing the flow of the welding current through the welding point when the pressure reaches a predetermined amount. The welding current through the welding points may be thus caused to flow only during the period that the pressure of the welding point 129 on the work is above the required welding pressure. The pressure switch 136 indicated in Fig. 11 is spring pressed by means of the spring 137 that may be adjusted by suitable adjustable means 138 to produce switch operations at desired predetermined pressures. The switch may be operated by a suitable pressure means 139 such as a diaphragm or piston and cylinder or bellows interiorly connected to the pipe connecting the pump 121 with the welder 124. The switch 136 may be electrically connected to the lines 4 and 5 of the source of supply of alternating current for completing the circuit of the main line relay switch 7. The relay solenoid or magnet 18 of the switch 7 may be located in the circuit of the switch 136, and thus the flow of the current through the magnet 18 is controlled by the pressure produced by the pump 121 as controlled by the valve 132. The magnet operates the contacts 14 to connect the main lines 4, 5, and 6 with the current-transforming and frequency-changing means 1.

The welder 124 may be provided with the primary and secondary similar in form to those shown in the Figures 1, 2, and 8, or it may be provided with a form of transformer shown in Figs. 12 and 15. In the form of construction illustrated in Figs. 11 to 16, the primary 140 of the transformer 141 is connected to the current-transforming and frequency-changing means 1, and the secondary 142 is connected to the welding points 128 and 129. When the current-transforming means 1 is connected to the source of supply of alternating current by the operation of the switch 136, a welding current is caused to flow through the work and the welding points 128 and 129 when the pressure of the liquid in the cylinder 127 and consequently the pressure of the welding points on the work have been raised to the required welding pressure. The current continues to flow until the valve 132 is released, and the restriction to the flow of the liquid from the cylinder 127 to the reservoir or tank 120 is reduced, which reduces the pressure on the pressure switch 136, which opens the switch. Thus the flow of the current through the secondary discontinues in advance of the reduction of the pressure of the welding point in the work below that of a welding pressure.

In the form of welder shown in Figs. 12 to 16, the transformer 141 is of the usual core type, having a laminated core 145 assembled within the primary coil 140. The secondary 142 comprises the centrally located lug 146, the shell part 147 to which the lug 146 is integrally connected, the cylinder 127 formed integral with the shell part 147, and the piston 148, which throughout its length fits the interior of the cylinder. A bracket 149 is electrically connected to the lug 146. The welding points 128 and 129 are located, one on the end of the bracket 149 and the other on the piston 148. The pressure in the cylinder 127 is controlled by the valve 132, which may be located in the handle 150, which may be secured to the shell part 147.

The welder is provided with suitable passageways that conduct the liquid in heat conductive relation with respect to the welding points 128 and 129 and the parts of the transformer 141. The passageways communicate with the flexible pipes 125 and 126 that are connected to the handle 150. The liquid flows through the pipe 125, and through certain of the passageways to the cylinder 127 and from the cylinder 127 to the flexible conductor 126 that returns the liquid to the reservoir or tank 120.

The flexible pipe 125 communicates with the passageway 153 which extends through the handle 150, the lug 146, and the bracket 149 to the well formed within the welding point 128. The flow of the liquid from the welding point 128 is through a pasageway 154 that communicates with the flexible connector 155 which connects the bracket 149 with the outer end of the piston 148, where the liquid enters the well in the welding point 129 and from whence it flows through the passageway 156 that extends preferably axially through the piston 148 and communicates with the interior of the cylinder 127. The cylinder 127 is connected by the passageway 157 that extends through the handle 150 in which is located the valve 132 for restricting the outflow of the liquid from the cylinder 148 through the passageway 157. The outlet part of the passageway 157 communicates with the flexible pipe 126 through which the liquid flows to the reservoir or tank 120 when the valve 132 is open.

When the valve 132 is opened, there is a free flow of the liquid through the passageways and through the welding point, which operates to cool the welding points and the parts of the transformer.

Preferably the piston 148 is provided with a cup-washer 160 for preventing the escape of the liquid about the piston. The core 145 and the primary 140 may be enclosed by means of the insulating plate 161 and the enclosing insulating sheet 162 that surrounds the core 145. The bracket 149, the insulating plate 161, the shell 162, and the shell 147 may be secured together by means of the electrically insulated bolts or tie rods 164. The handle 150 may be connected to the shell 147 by means of the screws 165.

The piston 158 is connected to a rod or bolt 166 located in a socket 167 formed in the cylinder frame. The socket 167 may be closed by a suitable threaded plug 168. A spring 169 surrounds the rod 166 and is located intermediate the plug 168 and the head 170 of the bolt. The bolt 166 is connected to the piston 148 by a yoke 171. The bolt 166 may be loosely slidably supported in the plug 168, the bolt and its spring being located at one side of the cylinder 127. The welding points 128 and 129 are also located in displaced relation with respect to the axis of the cylinder 127 and the spring 169 which is located at one side of the plane of the axis of the cylinder and the welding points 128 and 129 yieldingly counteracts the pressure of the liquid in the cylinder 127, coacting to produce a torque in the piston 148 which presses the lateral surface at the ends of the piston against the interior cylindrical surface of the cylinder 127 and thus produces a high electric contact pressure for free conduction of the current through the cylinder to the piston.

The valve 132 may be formed slightly conical and seated in a socket having a corresponding conical surface formed in a part of the handle 150. The socket may be closed by a suitable cover. The valve may be suitably pressed by a suitable pressure disc located intermediate the movable valve member and the cover in the manner well known in the art. Also the valve 132 is provided with a suitable trigger member 173, spring pressed by means of the spring 174 to produce a bias towards a valve-open position. The trigger member may be set into a suitable recess, and the surfaces of the recess may be located so as to limit the play of the trigger 173 as pressed by the spring 174.

In each form of the invention selected for illustrative purposes, the transformer that induces the welding current from the high frequency current of the primary is exceedingly light in weight. The welding points are positioned in close proximity to the transformer, which greatly increases the electrical efficiency of the welder. The welder is operated by pressure of the liquid that flows in heat conductive relation to the welding point, which reduces the number of connections commonly used for connecting welders with fixed parts of the apparatus. The welder may be operated by sources that produce high liquid pressures, which enables the use of a small, light weight cylinder and piston for operating the welding point and may be connected to the welder by light weight, flexible lines. The connections that are used are greatly reduced in their weight and may have greatly increased flexibility. In addition the secondary that produces the welding current is formed in part by the cylinder and piston that produce the welding pressure, and consequently the weight of the welder is correspondingly further reduced. Also the current-transforming and frequency-changing means produces a balanced load on the line and triples the frequency of the line, which enables the use of a light weight transformer on the welder. Also the production of a relatively high potential in the secondary of the current-transforming and frequency-changing means enables the use of small, light weight wires to connect the current-transforming and frequency-changing with the transformer on the welder. Thus, there is produced an exceedingly light weight welder that may be readily connected to the fixed parts of the apparatus by light weight, flexible lines, and consequently the welder may be readily manipulated manually to produce welds at a rapid rate.

I claim:

1. In a welder, a cylinder, and a piston, a welding point operated by the pressure in the cylinder, the welder having a passageway for conducting fluid to the cylinder and in heat-transmitting relation to the welding point, a valve located in the said passageway on the inlet side of the cylinder and normally biased to open position and closed by increase of pressure of fluid in the passageway, a pressure means on the outlet side of the cylinder for raising the pressure in the passageway to operate the valve and actuate the welding point.

2. In a welding system, a welder, a combined pneumatic and hydraulic booster hydraulically connected to the welder, means located on the welder for remotely controlling the booster, a source of supply of liquid, the welder having a cylinder and piston hydraulically connected to the booster and to the source of supply of liquid and through which the liquid normally freely flows, a welding point connected to the piston, the welder and the hydraulic booster having coacting means for closing the passageway to transmit pressure through the liquid from the booster to the piston of the welder upon the operation of the booster.

3. In a welder, a cylinder, and a piston, a welding point operatively connected to the piston, a transformer, the primary of the transformer inductively located with respect to the cylinder, the cylinder forming a part of the secondary of the transformer, means for conducting the secondary current to the welding point, the welder having a means for conducting liquid through the cylinder and in heat-transmitting relation to the primary and secondary of the transformer and the welding point, a pressure means for raising the pressure of the liquid in the cylinder for actuating the piston and pressing the welding point against the work.

4. In a welding system, a source of supply of electric current, a welder having a welding point, a cylinder and a piston for operating the welding point, a primary of a transformer inductively located with respect to the cylinder and piston for producing a secondary welding current through the cylinder, the piston and the welding point, a source of supply of liquid, the welder having passageways for conducting the liquid through the cylinder and the piston and the welding point, means for restricting the flow of the liquid from the cylinder for raising the pressure in the cylinder to operate the welding point.

5. In a welder, a cylinder and a piston, a welding point operated by the pressure of the cylinder, the welder having a passageway for conducting liquid through the cylinder and the welding point, means for closing the inlet and outlet of the said passageway, and means for raising the pressure in the said passageway for operating the piston.

6. In a welder, a cylinder and a piston, a welding point operated by the pressure in the cylinder, the welder having a passageway for normally conducting liquid through the cylinder and in heat transmitting relation to the welding point to cool the welding point, means for closing the inlet and outlet of the said passageway, and means for raising the pressure intermediate the inlet and outlet of the said passageway to raise the pressure in the cylinder for pressing the welding point against the work.

7. In a welder, a cylinder and a piston, a welding point connected to the piston and operated by the pressure in the cylinder, a primary of a transformer located in inductive relation to the cylinder for producing a secondary welding current through the cylinder and the welding point, the welder having a passageway for normally conducting liquid through the cylinder and the welding point for maintaining the cylinder and the welding point cool, means for closing the inlet and outlet of the passageway with respect to the said cylinder, a pressure means for raising the pressure of the liquid in the said cylinder for pressing the welding point against the work, and means operated by the pressure means for producing a flow of an electric current through the primary of the transformer.

8. In a welding system, a source of supply of electric current, a welder having a welding point, a cylinder and piston for operating the welding point, and a transformer inductively located with respect to the cylinder and piston for producing a secondary welding current through the cylinder, the piston, and the welding point, a source of supply of liquid under pressure, the welder having passageways for conducting liquid through the cylinder, the piston, and the welding point, means for restricting the flow of the liquid from the cylinder for raising the pressure in the cylinder to operate the welding point, means for producing a flow of the secondary current when the pressure of the welding point on the work reaches a predetermined point.

9. In a welding system, a welder having a transformer, a welding point, and a hydraulically operated means for operating the welding point, a combined pneumatic and hydraulic booster hydraulically connected to the hydraulically operated means of the welder and pneumatically operated, a source of supply of air under pressure connected to the booster, and a source of supply of liquid under pressure connected to the hydraulically operated means, a source of supply of electric current connected to the transformer, and a means located on the welder and connected to the booster for connecting the transformer to the source of electric current when the pressure of the welding point on the work reaches a predetermined point.

10. In a welder, a primary of a transformer mounted on the welder, a cylinder, the wall of the cylinder forming part of the circuit of the secondary of the transformer, a piston operated by the pressure in the cylinder, a welding point, a source of supply of liquid under pressure, means for conducting the liquid through the cylinder, the piston, and the welding point for removing the heat therefrom, means for restricting the flow of the liquid through the cylinder for raising the pressure in the cylinder to operate the welding point, a pressure switch operated according to the pressure of the liquid in the cylinder for connecting a transformer with a source of supply of electric current and producing a welding current through the cylinder, the piston, and the welding point when the pressure of the welding point against the work reaches a predetermined point.

11. In a welding system, a welder having a hydraulically operated means comprising a cylinder and a piston, a welding point operated by the pressure in the cylinder, a combined pneumatic and hydraulic booster hydraulically connected to the hydraulically operated means of the welder and pneumatically operated, a source of supply of air under pressure connected to the booster and a source of supply of liquid under pressure connected to the hydraulically operated means, means operated by the booster for closing the liquid connection on the outlet side of the booster and the inlet side of the hydraulically operated means, and means for connecting the source of supply of air under pressure to the booster for transmitting pressure through the entrapped liquid.

12. In a welding system, a welder having a hydraulically operated means comprising a cylinder, a piston operated by the cylinder, a welding point connected to the piston, and a transformer inductively located with respect to the cylinder to produce a welding current through the cylinder, the piston, and the welding point, a combined pneumatic and hydraulic booster hydraulically connected to the cylinder and pneumatically operated, a source of supply of air under pressure connected to the booster and a source of supply of liquid under pressure connected to the cylinder, means operated by the booster for closing the liquid connection on the outlet side of the booster and the inlet side of the cylinder, means for connecting the source of supply of air under pressure to the booster for transmitting pressure through the entrapped liquid from the booster to the cylinder, and means operated according to the pneumatic pressure in the booster for directing a current through the transformer to produce a flow of a welding current through the cylinder and the welding point.

13. In a welder, a cylinder and a piston, a welding point operated by the pressure of the cylinder the welder having a passageway for normally conducting liquid through the cylinder and the welding point, means for restricting the flow of the liquid from the cylinder, and means for raising the pressure in the cylinder for operating the piston when the flow is restricted.

14. In a welding system, a source of supply of electric current, a source of supply of liquid, a welder having a welding point, a cylinder and a piston for operating the welding point, the welder having a passageway for conducting the liquid through the cylinder and the welding point, means for raising the pressure of the liquid in the cylinder, an electric switch, means for operating the switch when the pressure of the liquid reaches a predetermined point for causing a flow of a welding current through the welding point.

15. In a welding system, a source of supply of electric current, a source of supply of liquid under pressure, a welder having a welding point, a cylinder and piston for operating the welding point, the cylinder having a passageway for conducting the liquid through the cylinder and the welding point, means for restricting the flow of the liquid through the cylinder for raising the pressure in the cylinder, a pressure-operated switch, means for operating the switch according to the pressure of the welding point on the work for causing a flow of a welding current through the welding point when the pressure of the welding point on the work reaches a predetermined point.

16. In a welding system, a welder having a cylinder and a piston, a welding point operated by the pressure in the cylinder, a pneumatically operated hydraulic booster hydraulically connected to the cylinder of the welder for operating the welding point, means located on the welder for remotely controlling the booster to raise the pressure in the cylinder, the booster, the cylinder, and the welding point having a passageway for normally conducting free flowing liquid through the booster, the cylinder, and the welding point, and means operated by the pressure produced by the booster for restricting the out-flow of the liquid from the cylinder when the booster is operated to raise the liquid pressure to operate the piston and the welding point.

WILLIAM H. MARTIN.